US006625624B1

(12) United States Patent
Chen et al.

(10) Patent No.: US 6,625,624 B1
(45) Date of Patent: Sep. 23, 2003

(54) INFORMATION ACCESS SYSTEM AND METHOD FOR ARCHIVING WEB PAGES

(75) Inventors: Yih-Farn Robin Chen, Bridgewater, NJ (US); Chung-Hwa Herman Rao, Metuchen, NJ (US); Ming-Feng Chen, Hsinchu (TW)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/475,556

(22) Filed: Dec. 30, 1999

Related U.S. Application Data

(60) Provisional application No. 60/133,345, filed on May 10, 1999, provisional application No. 60/126,705, filed on Mar. 29, 1999, provisional application No. 60/118,651, filed on Feb. 4, 1999, and provisional application No. 60/118,367, filed on Feb. 3, 1999.

(51) Int. Cl.7 .............................................. G06F 17/30

(52) U.S. Cl. ...................... 707/204; 707/10; 707/104.1; 707/203; 709/245

(58) Field of Search ............................. 707/4, 10, 100, 707/203, 204, 1, 104.1; 709/219, 245

(56) References Cited

U.S. PATENT DOCUMENTS

| | | | | | |
|---|---|---|---|---|---|
| 5,806,062 | A | * | 9/1998 | Chen et al. | 707/4 |
| 5,860,071 | A | * | 1/1999 | Ball et al. | 707/100 |
| 5,898,836 | A | * | 4/1999 | Freivald et al. | 707/513 |
| 5,978,842 | A | * | 11/1999 | Noble et al. | 709/218 |
| 6,026,437 | A | * | 2/2000 | Muschett et al. | 709/219 |
| 6,167,453 | A | * | 12/2000 | Becker et al. | 709/245 |
| 6,199,071 | B1 | * | 3/2001 | Nielsen | 707/204 |
| 6,249,795 | B1 | * | 6/2001 | Douglis | 707/511 |
| 6,282,548 | B1 | * | 8/2001 | Burner et al. | 707/104.1 |
| 6,289,346 | B1 | * | 9/2001 | Milewski et al. | 707/10 |
| 2002/0016789 | A1 | * | 2/2002 | Ong | 707/10 |
| 2002/0065800 | A1 | * | 5/2002 | Morlitz | 707/1 |
| 2002/0073058 | A1 | * | 6/2002 | Kremer et al. | 707/1 |

OTHER PUBLICATIONS

Douglis, Fred, "Experiences with the AT&T Internet Difference Engine," 22nd Int'l Conf. for the Resource Mgt and Performance Eval. of Enterprise Continuing Sys. (CMG96), 12–96, p. 1–14.*

Chen et al., "TopBlend: An Efficient Implementation of HtmlDiff in JAVA," WebNet'00, pp. 1–6.*

Chen et al., "CIAO: A Graphical Navigator for Software and Document Repositories," IEEE, 1995, pp. 66–75.*

* cited by examiner

*Primary Examiner*—Charles Rones

(57) ABSTRACT

The present invention presents a system and method of providing information retrieved from a server from across a communication network that enables archiving services that do not interfere with existing components and protocols. The services enable users to retrieve and/or search for old information, even after such information has evolved or disappeared from the original server. The network resource naming (e.g. URL) format is extended to include archive directives that are intercepted and performed by a proxy server. The proxy interprets the archive directive and executes the specified archival command: e.g., adding the information to a storage repository, searching and retrieving the information from the storage repository, scheduling automatic archiving of specified server information, transparent archiving of information that is accessed by the client or of the client's cache. The information can be easily indexed by a timestamp. Multiple proxy servers can collaborate permitting information to be archived in a distributed fashion. Embodiments of the present invention advantageously do not require changes to client or server software or communication protocols.

10 Claims, 16 Drawing Sheets

FIG. 3

| System Command | Description |
|---|---|
| reset & resetall | Reset the system. The system will reload the external configuration file and reset to the initial state. |
| connect=[On\|Off] | Run the system as on-line mode (On) or off-line mode (Off). For the off-line mode, the system won't create "Agent Thread" for retrieving web pages. Instead, it responds to the requests with local cache files and logs those requests that cannot find pages in the cache. |
| setnet=netid | Switch the network to a new one "netid". This feature is used when the user is using more than one dial-in network for Internet access. If netid does not match the id in the control file, the system will call a CGI -bin to dial-in a different network. |
| dns=dns_server | Create a DNS agent on the local host. It then forwards local DNS requests to dns server. |
| forword=loaclport,rhost:rport[,proxyhost:port] | Create a TCP forwarding service. Connection to localport will be mapped to rhost:rport, and traffic to the former will be forwarded to the latter. This command uses "SSL proxy" protocol to connect to proxyhost:port. |
| pasv=rhost:rport | Create a passive channel to another server (running on rhost:rport). |
| htwalk= level[, -option]*[function[=args]]* | **level:** specify the depth of hyper reference hierarchy the system will walk down.<br>**option:** options include: (a). Retrieving image files *(image)* or not *(noimage)*; (b). Accessing only local pages *(loacl)* or any Web pages *(global)*.<br>**function:** the javabin function that is called for each visited page. |

*FIG. 5*

| HTTP **Extension** | **Description** |
|---|---|
| CONNECT *rhost:rport HTTP/1.0* | SSL socket proxy command. The command establishes a TCP connection between the sender and receiver so that the traffic to the sender of the message will be forwarded via this connection to the receiver proxy, which then forwards them to *rhost:rport.* |
| PASV *ServerProxy->connect host:port* | Receive a *passive* channel from ServerProxy. The passive channel will be used by Receiver (who is the ClientProxy in this case) to request Web pages. *"connect_host:port" is* the host and port of ClientProxy. |
| NEWPASV *connect host:port* | Request a new passive channel to *connect host:port.* Receiver will issue PASV command to *connect_host:port.* |
| MULTI *separator ... separator* | Reuse the connection. |

*FIG. 7A*

```
public class inputFilterSample extends javabin {
   public Object Execute(OutputStream os,Hashtable ht)throws IOException {
                  String url = (String)ht.get("url");
                  String fname = (String)ht.get("path");
                  byte orig_date[] = readCacheFile(fname);
                  byte result_data[] = doInputFilter(orig_data);
                  writeCacheFile(fname, result_data);
   }
   ...
}
```

*FIG. 7B*

```
public class outputFilterSample extends javabin {
   public Object Execute(OutputStream os,Hashtable ht)throws IOException {
                  String url = (String)ht.get("url");
                  String fname = (String)ht.get("path");
                  byte cached_date[] = readCacheFile(fname);
                  byte result_data[] = doOutputFilter(orig_data);
                  os.write(result_data);
   }
   ...
}
```

*FIG. 7C*

```
public class headerFilterSample extends javabin {
   public Object Execute(OutputStream os,Hashtable ht)throws IOException {
                  String orig_header = (String)ht.get("ht.header");
                  String result_header = doHeaderFilter(orig_header);
                  os.write(result_header.getBytes());
   }
   ...
}
```

*FIG. 8*

| Statement | Description |
|---|---|
| | Null statement, used as comment. |
| ":if exp" ...":elseif exp" ... ":else" **":endif"** | Conditional statement. The format of "exp" is " str1 =str2" or "strf1=str2". |
| ":reset" | Reload configuration and restart the proxy services. |
| ":htwalk url argument" | Execute an HTML set walking immediately. |
| ":forward lport,rhost:rport" | Create a TCP forwarding channel. |
| ":pasv host:port" | Connect another proxy server and build a passive channel. |
| ":block class_name arglist"...":endblock" | Invoke javabin.class name (with statements.) |
| ":javabin class name arglist" | Invoke a javabin.class name. |
| ":zip file filename"**& ":unzip dump**filename" | Compress/decompress an file. |
| :ctrlmacth var ctrl -type" ...**":endctrl"** | Match the entries with ctrl_type in ctrlfile.txt and store in ${var.id}, ${var.type), $(var.arg), and $(var.url) variables. |
| :ctrladd ctrl_type ctrl arg ctrl_url" | Add a new entry of ctrlfile.txt |
| **:ctrldelete selected** | Delete the entries whose ctrl_id is assigned in arguments. |
| **:cronmatch var"... ":endcron"** | Match the entries of scheduling and store in ${var.id), ${var.hour), $(var.wday), ${var.cmd), ${var.url), and $(var.arg) variables. |
| **:cronadd** hour wday cmd url walk level arglist | Add a new entry of scheduling. |
| **":crondelete selected"** | Delete the entries whose cron_id is assigned in arguments. |
| :sysinfo var **(iforward l iagent\|ihtwalk\|threads)" ...** :endsys" | List the system information. |

FIG. 9

```
Public class scriptFunctionSample extends javab in {
    public Object Execute(OutputStream os. Hashtable ht) throws IO Exception {
        ic m d pC m d = (ic m d) ht.get ( ".pscript");
        Hashtable htVar = ( Hashtable) ht.get (".h tvar");
        StringTokenizer st = (StringTokenizer) ht.get (".argv");
        byte block[] = (byte [) ht.get (".block ");     // = null if cmd is : Javabin
        String cmd = st.nextToken():
        if(cmd.equals ("xxx")) {

            htVar.put("foo ", value);
            pC md.callScript(block);              // apply new value to script

        }
    }
}
```

```
public class htwalkGrepSample exents javabin {
  public void initProc() {
          // init process
  }
  public void finalProc() {
          // final process
  }
  public Object Execute (OutputStream os,Hashtable ht)throws IOException{
          initProc(); // init process
          String htcmd = (String)ht.get("htcmd");
          String url = (String)ht.get("url");
          String args = (Strin g)ht.get("args");
          String fname = (String)ht. get( "path");
          String key = (String)ht.get("walkopt");
          finalProc(); // final process
          if (keywordMatched(fnarne, key)) {
  ShowGrepResult(url, fname);
  }
          }
    i K
}
```

```
<!-----------------with iproxy only --------------->
<!-----:portal nop
        :portal version
        :portal to-read
        :portal dolog
        :portal top10
      :portal nop    --->
```

| Symbol | Qty | Purch Price | Market Price | Today's Change | Invested +Comm. | Market Value | Gain Loss | Update E.T. | Vol |
|---|---|---|---|---|---|---|---|---|---|
| I | 257.0 | 36.5 | 91.375 | -2.188 | 9745.5 | 24397.13 | 14651.63 | 14:38 | 774M |
| NSCP | 50.0 | 21.0 | 70.750 | -1.313 | 1069.95 | 3537.5 | 2467.55 | 14:42 | 303M |
| EGRP | 40.0 | 39.38 | 56.875 | -5.563 | 1595.15 | 2275.0 | 679.85 | 14:42 | 15.46M |
| AUTOREFRESH | Totals(at 02/02/99 14:58 ET) | | | | 12410.6 | 30209.63 | 17799.02 | | |

INFORMATION ACCESS SYSTEM AND METHOD FOR ARCHIVING WEB PAGES

CROSS REFERENCE TO RELATED APPLICATIONS

This application claims priority to Provisional Application Serial No. 60/118,367, "A Proxy-Based Personal Portal," filed on Feb. 3, 1999, and to Provisional Application Serial No. 60/118,651, "A Proxy-Based Personal Portal," filed on Feb. 4, 1999, and to Provisional Application Serial No. 60/126,705, "Archiving Web Pages with iProxy," filed on Mar. 29, 1999, and to Provisional Application Serial No. 60/133,345, "Proxy-Based Services," filed on May 10, 1999, the contents of which are incorporated by reference herein.

This application is also related to the Utility Patent Application, "Information Access System And Method," Ser. No. 08/994,600, filed on Dec. 19, 1997, now abandoned, the contents of which are incorporated by reference herein.

FIELD OF THE INVENTION

The present invention relates generally to information access systems, and, more particularly, to information access systems used to retrieve information from across a communication network.

BACKGROUND OF THE INVENTION

As more resources become available on communication networks such as the Internet, it has become increasingly more difficult to locate, manage, and integrate them. Many information retrieval clients such as the browsers by Netscape, Microsoft, and Mosaic have been introduced to make searching and retrieving information on the network more convenient and productive for end-users. Unfortunately, the closed architecture of such browsers has rendered the software design overloaded and monopolistic. Customizing the information retrieval process is difficult if not impossible.

For example, it would be advantageous to enable users to retrieve and search through old information—even after the original information has evolved or disappeared from the original server. Many websites provide timely content such as news that changes on a regular basis. A user may wish to revisit a web page that the user saw many months earlier, or search for information the user recalls seeing on a web page that the user visited in the past. Client browsers typically only provide a rudimentary save feature and lack basic archiving functionality. Any such functionality should be provided by some specialized application which must be installed or integrated with each client. Otherwise, the user must either have the foresight to explicitly save pages he or she might be interested in—or must rely on the content administrator to provide some archive and search facility.

SUMMARY OF THE INVENTION

The present invention presents a system and method of providing information retrieved from a server from across a communication network that enables archiving services that do not interfere with existing components and protocols. The services enable users to retrieve and/or search for old information, even after such information has evolved or disappeared from the original server. The network resource naming (e.g. URL) format is extended to include archive directives that are intercepted and performed by a proxy server. The proxy interprets the archive directive and executes the specified archival command: e.g., adding the information to a storage repository, searching and retrieving the information from the storage repository, scheduling automatic archiving of specified server information, transparent archiving of information that is accessed by the client or of the client's cache. The information can be easily indexed by a timestamp. Multiple proxy servers can collaborate permitting information to be archived in a distributed fashion. Embodiments of the present invention advantageously do not require changes to client or server software or communication protocols.

These and other advantages of the invention will be apparent to those of ordinary skill in the art by reference to the following detailed description and the accompanying drawings.

BRIEF DESCRIPTION OF THE DRAWINGS

FIG. 3 sets forth a list of system commands that can be invoked using URL extensions.

FIG. 5 sets forth a list of commands that can be invoked using HTTP extensions.

FIG. 7A, 7B and 7C set forth examples of cgi-bin filter programs.

FIG. 8 sets forth a list of scripting commands that can be used with a document pre-processing system.

FIG. 9 sets forth arguments for use with a javabin class invoked by the "block" and "javabin" commands in FIG. 8.

FIG. 11 sets forth an example of a grep class for use with a walking facility.

DETAILED DESCRIPTION

Figure 1:
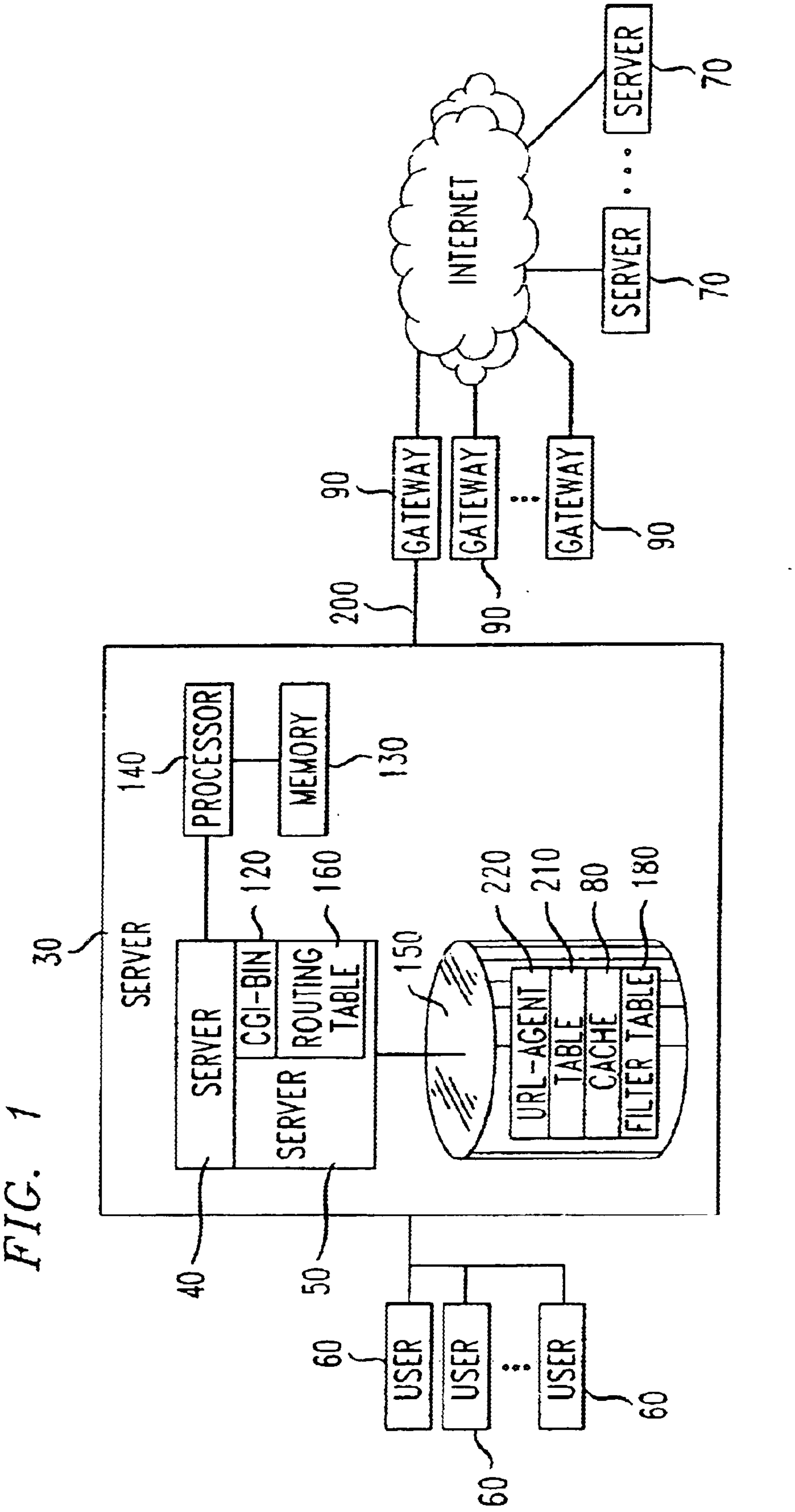
FIG. 1 sets forth a diagram of an information access system and method illustrating an embodiment of the present invention.

FIG. 1 shows a diagram of a communications system which is suitable to practice the present invention. In the exemplary embodiment shown, a proxy server 30 is connected to a communication network through communication link 200 to a gateway 90. The proxy 30 is shown shared by a number of clients 60 who are each executing an information retrieval program such as a browser. In an alternate embodiment, the proxy and the client browser can be executed as processes on the same client machine. Servers 70 provide information content to the clients 60 utilizing some document serving protocol, such as the Hypertext Transfer Protocol (HTTP) as described in T. Berners-Lee et al., "Hypertext Transfer Protocol—HTTP/1.0," RFC 1945, Network Working Group, 1996, which is incorporated by reference herein. As used herein, a document serving protocol is a communication protocol for the transfer of information between a client and a server. In accordance with such a protocol, a client 60 requests information from a server 70 by sending a request to the server and the server responds to the request by sending a document containing the requested information to the server. Servers, and the information stored therein, can be identified through an identification mechanism such as Uniform Resource Locators (URL), as described in detail in T. Berners-Lee et al., "Uniform Resource Locators," RFC 1738, Network Working Group, 1994, which is incorporated herein by reference. In an advantageous embodiment, the network is the Internet and the servers 70 are Web servers.

Proxy server 30, as is known the art, has a processor 140, memory 130 and a non-volatile storage device 150 such as a disk drive. The memory 130 includes areas for the storage of, for example, computer program code and data, as further described below. The proxy server 30 is shown executing two processes: an access server 40 and a 105 web server 50, both of which are further described in the pending utility patent application, "Information Access System And Method," Ser. No. 08/994,600, filed on Dec. 19, 1997, now abandoned,. The access server 40 behaves like a typical proxy server and accepts document requests (in a preferred embodiment, using standard TCP ports and HTTP) and routes them to other proxies or the desired server. The built-in server 50 is designed to act as a function execution engine rather than just an information provider.

Figure 2:
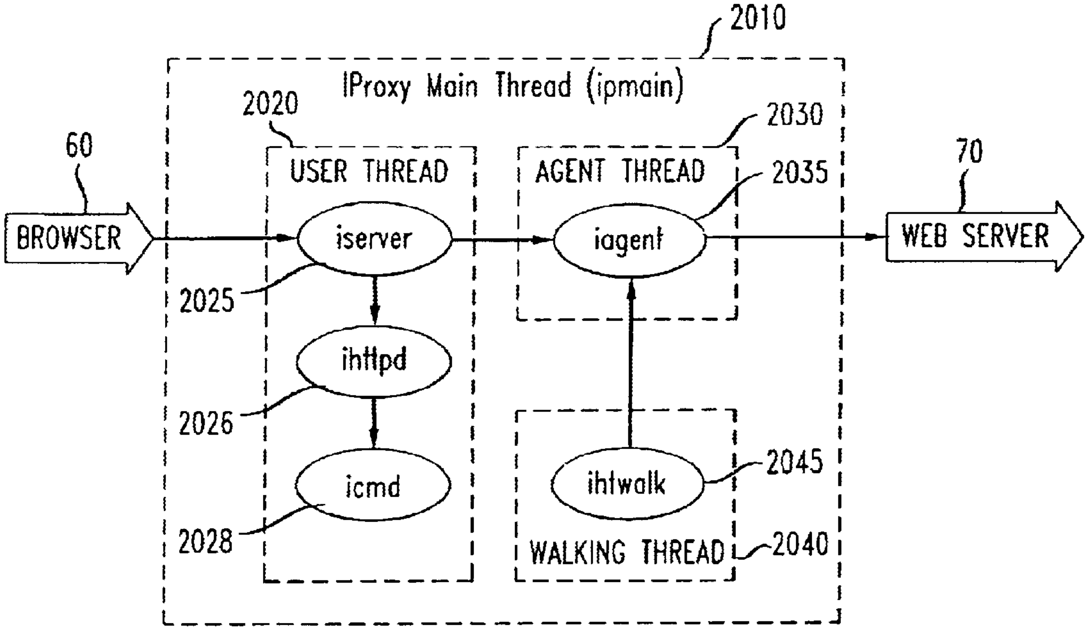
FIG. 2 sets forth an example of a system architecture illustrating an embodiment of the present invention.

FIG. 2 illustrates an exemplary system architecture, adapted for HTTP and implemented as Java classes, providing the functionality necessary to practice an embodiment of the present invention. When the proxy application is started, the main thread 2010 listens on the proxy port and receives and responds to HTTP requests from 115 clients 60 (browsers or other proxies). The system creates a new User Thread 2020 to serve each new request. The iserver class 2025 parses the client's request and forwards commands to iagent 2035 for remote web access or to ihttpd 2026 for localhost access. The iserver class 2025 also implements various protocol extensions further discussed below in Section 1. The ihttpd class 2026 implements the web server described above and will return an external file with the http header or execute a local CGI script to generate the replying message online. If the content is in a special scripting format described in further detail below in Section 3, icmd 2028 will be invoked to parse the script and interpret and execute any commands embedded in the document page.

The iagent class 2035 of the agent thread 2030 connects to a remote web server 70 or proxy to request a Web page. iagent 2035 can cache the page and return the page to iserver 2025 or to ihtwalk 2045, a facility to walk the html tree structure to collect and archive pages. The ihtwalk class facility is further described below in Section 4 in the description of the walking facilities.

1. Protocol Extensions

The URL and HTTP protocols can be extended to include additional system commands that advantageously permit conventional information retrieval clients to be utilized with embodiments of the present invention. This can be accomplished in a manner that is transparent to the client browser application and, thus, requires no new user interface.

As an illustration of an example format for a URL extension is:

URL?iproxy&command where "?iproxy" is a keyword, and "command" is a service that might be applied to a given URL or a system command that is irrelevant to the given URL. For example, the command could invoke a archiving service (as described in further detail below in Section 5) or can be used to tailor system functions. The iserver class 2025 parses the commands and forwards the command to ihttpd 2026 which, in turn, forwards the command to icmd 2028 for processing. FIG. 3 sets forth a variety of system commands that can be defined using URL extensions.

Figure 4:
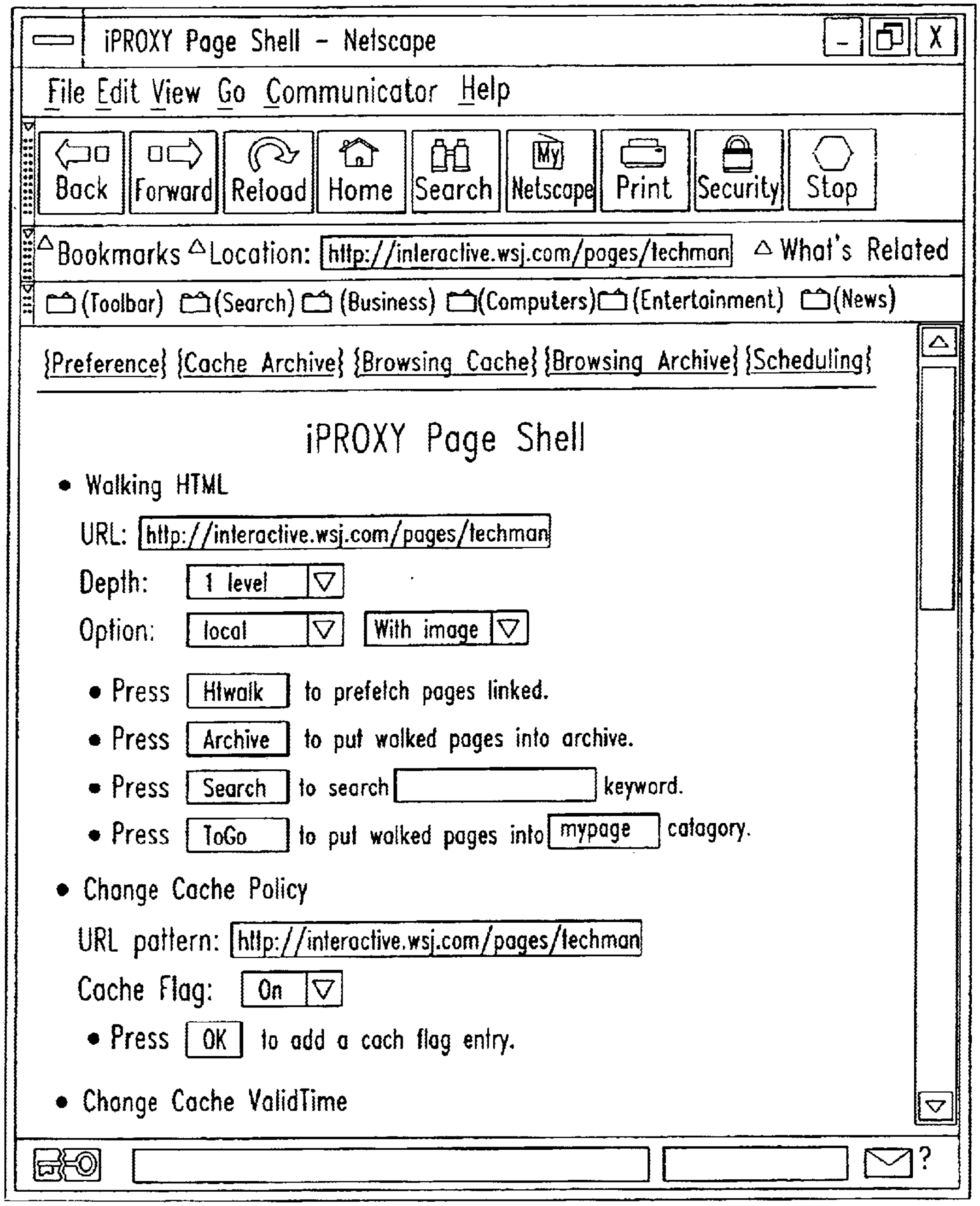
FIG. 4 sets forth a screenshot of an example service menu.

In another embodiment of the present invention, a URL extension can be used to invoke a dynamically generated menu of entry points for available services and present it to the user's browser when requested. For example, the URL naming protocol can be extended by introducing a new naming scheme:

URL??

where the double-question mark "??" is a trigger to invoke a service menu. The service menu can be implemented to inherit the same cookies as the current URL. The proxy subsystem intercepts the request from the browser with the above request pattern, generates a menu on-the-fly and returns the menu to the browser as an HTML file. FIG. 4 shows an illustrative example of a menu obtained after a user browses a webpage, here "http://www.interactive.wsj.com/pages/techmain.html", and types "??" after the URL and presses enter. The menu platform defines entries a number of services and user-defined macros on a per URL-set basis. For example, FIG. 4 permits the user to, inter alia, change cache policies, archive or prefetch pages in the html tree, or search the page hierarchy for a keyword. The menu system chooses the proper menu description based on the current URL.

The menu service has numerous advantages. It does not introduce a new graphical user interface, but rather presents the menu in HTML content shown in normal browsers. It preserves user's cookies and is easily extensible. New service entries can be readily plugged into the menu. The concept of the service menu is akin to pushing special keys during a traditional telephone conversation, for example, "##"—the network then places the line on hold and announces a service menu for selection; after menu selection, the line is placed back to the original conversation.

New commands can also be introduced to HTTP for special communications among multiple proxy servers to, for example, establish special connections (like persistent channels) and/or perform value-added services (like TCP forwarding). For example, the commands set forth in FIG. 5 can be defined for such communications and used to extend the conventional HTTP commands.

2. Filters

Figure 6:
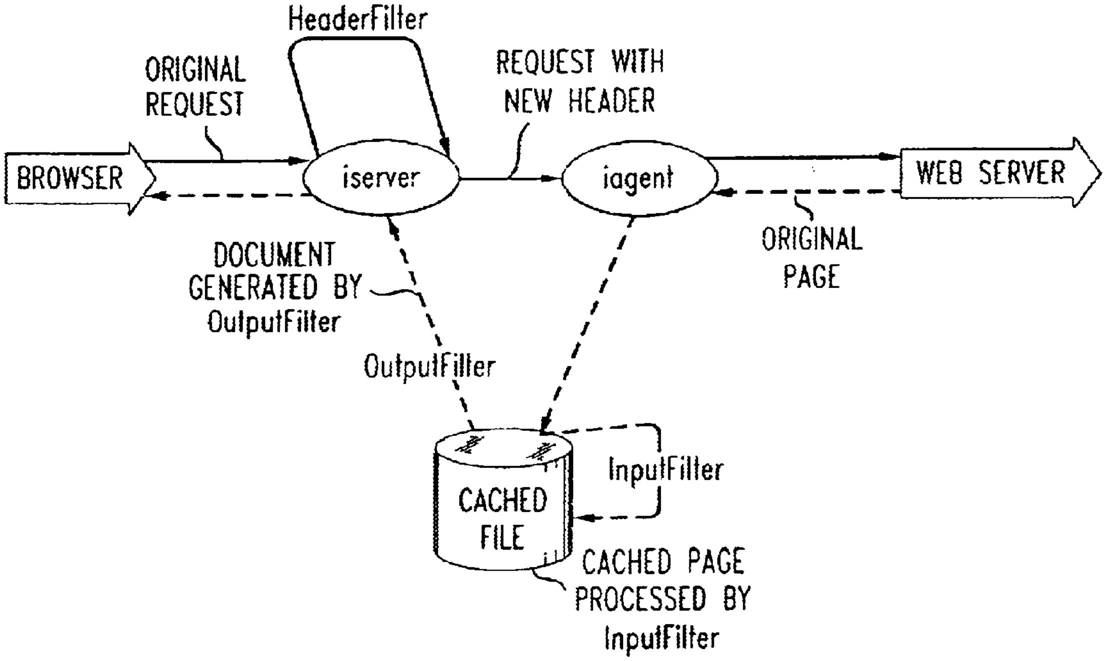
FIG. 6 sets forth a diagram illustrating the use of filters with an information access system and method.

Support is provided for the processing of data by filters. FIG. 6 illustrates how filters can be applied to http headers, pages returned from the web, and pages returned from a local cache. For example, an input filter can be used to add new components (menubars, etc.) or modify returned pages (replace some remote data with local data, etc.). Data from servers can also be condensed, compressed, encrypted, patched, etc., prior to the corresponding filters converting it back into its original format before returning it to a user.

The filter functions shown in FIG. 6 can be specified in a configuration file for the proxy's built-in web server. The function can be specified with a corresponding URL pattern, such that the filter is applied to URLs matching the pattern. For example, the following entries:

InputFilter /bin/fpack.cgi http://*/resume.html

OutputFilter /bin/funpack.cgi http://*/resume.html

HeaderFilter /bin/forward.cgi http://www.att.com/* specify cgi functions for the indicated filters and URL patterns. As indicated in the HeaderFilter entry, all HTTP calls for the web server www.att.com will be processed by the cgi function forward.cgi before being sent out to the remote web server (or proxy server), and so on. Filters can also be specified using an extended URL command. For example, the system can be configured to calls filters with the arguments:

http://localhost/javabin/inputfilter?url=cached_url&path=cache_file http://localhost/javabin/outputfilter?url=cached_url&path=cache_file http://localhost/javabin/headerfilter?ht.header=header_lines Filter programs can be implemented as cgi-bin programs and inherit the cgi-bin API. Every filter programs implemented as a Java class will create an instance when invoked. FIGS. 7A, 7B, and 7C show example cgi-bin filter programs. FIG. 7A shows an inputfilter; the Execute method reading the "cache_file" and updating the file if necessary. In FIG. 7B, outputfilter uses "cache_file" as input and sends the result to OutputStream which will be sent back to the original caller. FIG. 7C shows headerfilter which gets the original http header (multiple lines without the empty line) from Hashtable, and outputs a new header to OutputStream.

3. Scripting Facilities

In addition to Java class invocation mechanisms and standard scripting mechanisms such as Ksh and Perl, it is advantageous to provide support for document preprocessor scripting. Proxy-side scripting allows the different system components to be integrated in a light-weight manner that has a syntax and a semantics that is very HTML-like. Scripting provides a method for plugged-in services/functions to access built-in functions, server status and data structure, and the cache. A scripting proxy pre-processor can also provide a communication media for multiple proxy servers.

The inventors devised a scripting language providing extra macros statements based on the standard document markup language HTML. The proxy server pre-processes the scripts and turns the comments into pure HTML. In a preferred embodiment of such scripting, it should include support for variable declarations, conditional statements, sets of built-in functions, and interfaces to invoke cgi-bin. The script can be a standard HTML-like plain text file that contains the macro statements. In order to identify the document as a script, an identifier should be included; for example, the first line in the script can start with:

#!/iproxy/script

The arguments of a cgi-bin can be accessed using "${arg}" inside the script file. FIG. 8 sets forth a list of built-in statements that are useful for scripting. When using the ":block" and ":javabin" commands, the script will invoke a javabin class with the arguments set forth in FIG. 9.

4. Walking Facilities

One useful facility is a basic function supporting a mechanism to walk through document page hierarchies. This is similar to what "find" and "tw" (file tree walk) do on Unix file systems. The walking action is specified by a root URL where the action starts, a specification of how many levels the action will visit, and certain additional properties such as whether or not image files should be included. For each visited page, one or more of a list of functions can be invoked one by one to perform tasks on a cache of the page. Examples of such functions include functions for archiving the web pages, searching for keywords, and creating index tables.

Figure 10:
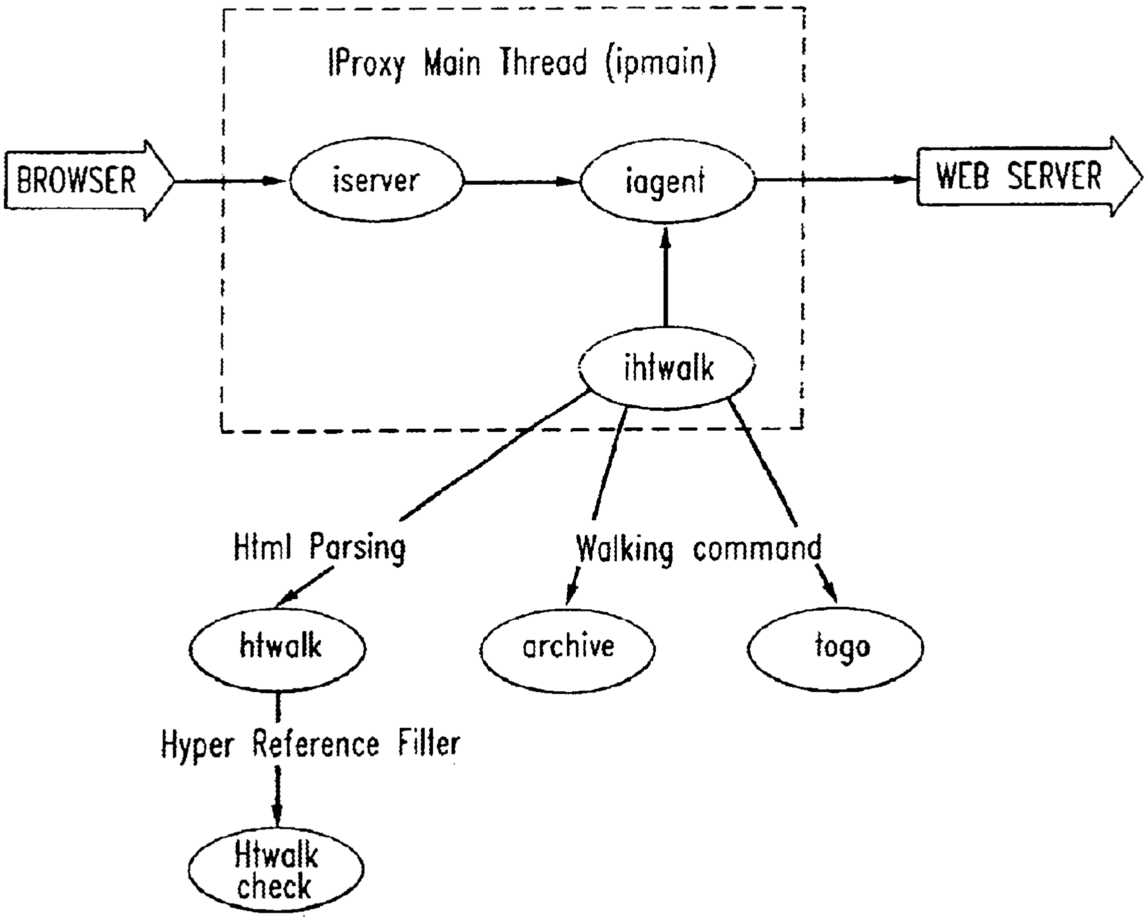
FIG. 10 sets forth a diagram illustrating the use of archiving with an information system and method.

See FIG. 10 for the structure of a walking function, "htwalk", designed in accordance with a preferred embodiment of the present invention. The syntax for the walking function is given in FIG. 3. For example, for the URL http://www.att.com/?iproxy&htwalk=3,-local,-image,archive,grep=Cable the system walks down 3 levels for pages referred (directly or indirectly) by www.att.com, including image files, but only for those pages on the local server. For each visited page, the system calls the function archive to archive the page and the function grep to search for the keyword "Cable" in the page. For each visited page, the system calls the following cgi-bin programs one-by-one:

/bin/archive.cgi?url=visited_page&args=int_no,-local&path=cached_file
&htwalk=archive /bin/grep.cgi?url=visited_page&args=int_no,-local&path=cached_file
&htwalk=grep&walkopt=Cache FIG. 11 sets forth an example of a grep class used to implement the walking function.

5. Archiving Service

The URLs processed by the proxy 30 can be extended to include archive directives that add data to a storage repository, e.g. device 150, and for retrieving the archived data. The new commands are intercepted and performed by the proxy server. Because a proxy is used as a middleman between the browser and the web servers, the new archiving services are just plug-in components and do not interfere with existing components and protocols.

As an advantageous example, the URL naming scheme can be extended to include URLs in the following format:

http://view@host/path where the "view" is a date, for example in the format yyyymmdd, when the corresponding page (i.e., http://host/path) has been retrieved from the original web server and stored into the archive repository. The timestamp can be used as the key to locate the page from the repository. For example, http://19980701@www.att.com/would refer to the page http://www.att.com that was retrieved and archived from the www.att.com web server on Jul. 1, 1998.

More advanced features can be implemented to allow specifying an action in front of the date for locating an alternative page on the archive server if the dated page does not exist. The system first locates the page archived on that date. If the desired page is not found in the repository, the system then searches for the page in the repository before or after the date and returns the first found page. For example, the following syntax for naming archived pages can be used:

http://[+|−]yyyymmdd[.hhmmss]@host/path

Thus, http://+date@host/path would choose the first page found after the specified date; on the other hand, http://−date@host/path points to the first page before the date. For example, http://+19980701@www.att.com points to the first page that was archived on Jul. 1, 1998 or after, while http:/119980701@www.att.com is for the page archived on Jul. 1, 1998, or before. As shown in the syntax, the granularity of "view" can be readily taken down to the second level of hours, minutes, and seconds.

The above naming scheme advantageously is compatible with the conventional URL protocol, which defines network resource naming as proto://[user[:password]@]host/path. For example, the URL ftp://foo:bar@ftp.research.att.com/README points to a README page on the FTP server ftp.research.att.com, while accessing on behalf of the user foo with the password bar. The user/password portion of the URL protocol is undefined in the HTTP protocol; accordingly, the above naming scheme can take advantage of this for archive naming.

Multiple methods can be used to invoke the archive service and store data in the repository:

Command Extensions. Using any of the methods described above under Section 1, a user can invoke the archiving service. For example, the following URL:

http://www.research.att.com/iPROXY.html?iproxy&action=archive can be used to cause the system to archive the page http://www.research.att.com/iPROXY.html.

Figure 12:
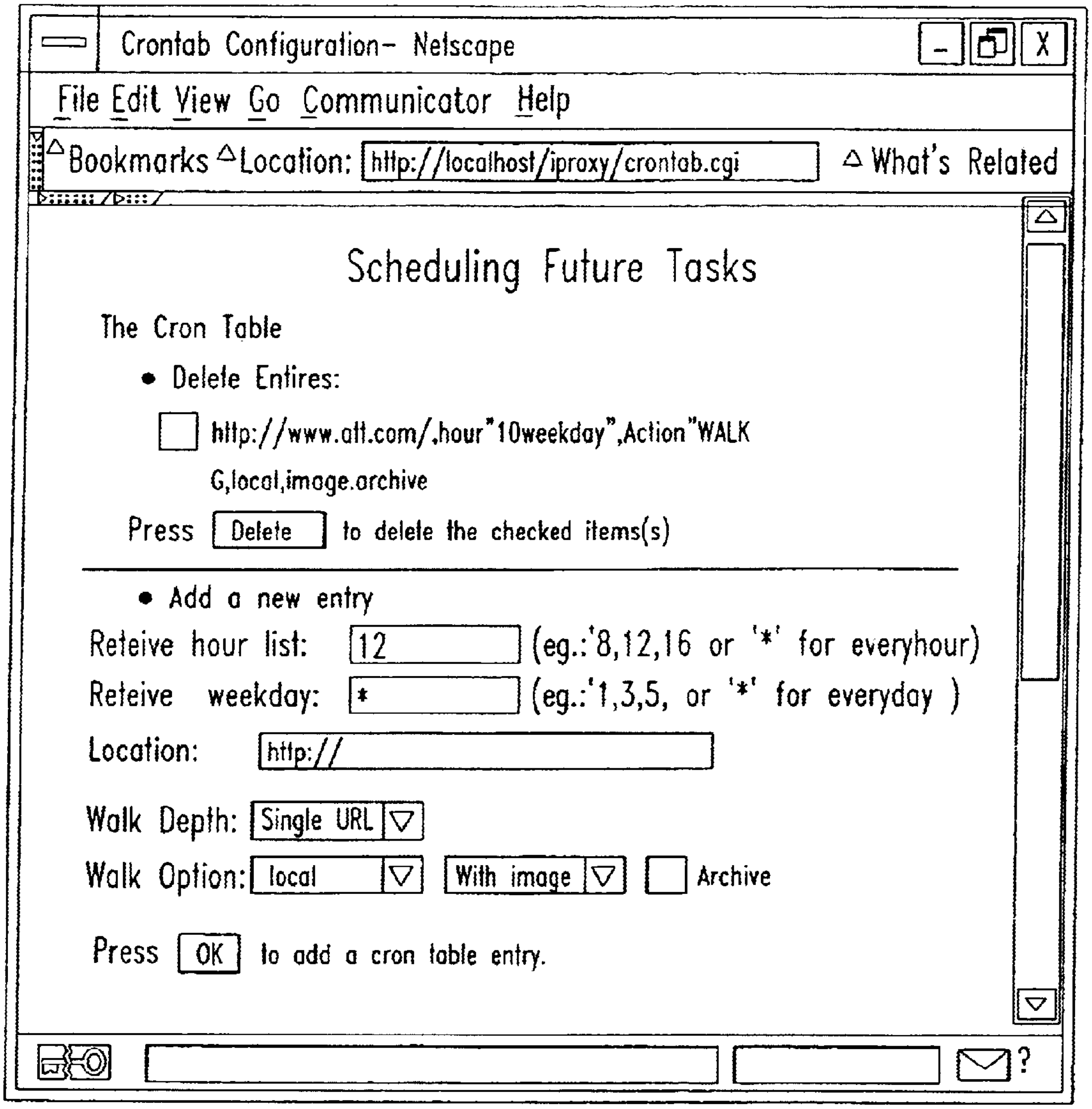
FIG. 12 sets forth a screenshot of an example cron menu.

Scheduled Archiving. The system can also be extended to contain a server that executes an archiving task at a designated time, e.g. like cron command in Unix systems. The walking facilities described above can be used to "walk" through a web site for a set of HTML pages. As described above, the walking can be defined by a root URL and parameterized by (a) the depth of walking through hyper-references under HTML pages, (b) with or without image files embedded in HTML pages, and (c) walking through pages on the local web site or on all web sites. FIG. 12 shows an example page interface for a cron cgi program which can be used to add a cron job to archive a web site. Users can schedule an archive task on a daily or weekly basis.

Transparent Archiving. The system can support a finction of archiving selected web pages whenever they have been accessed automatically. The specification can be done through the CacheFlag of a cache command, which specifies the caching policy:

CacheFlag Archive URL-expression

Whenever a requested URL matches the URL-expression, the system puts the data in the archive repository.

Archiving Browser Cache. The system can support a function for scanning data cached on a browser's cache area and archiving them into the repository.

Figure 13:
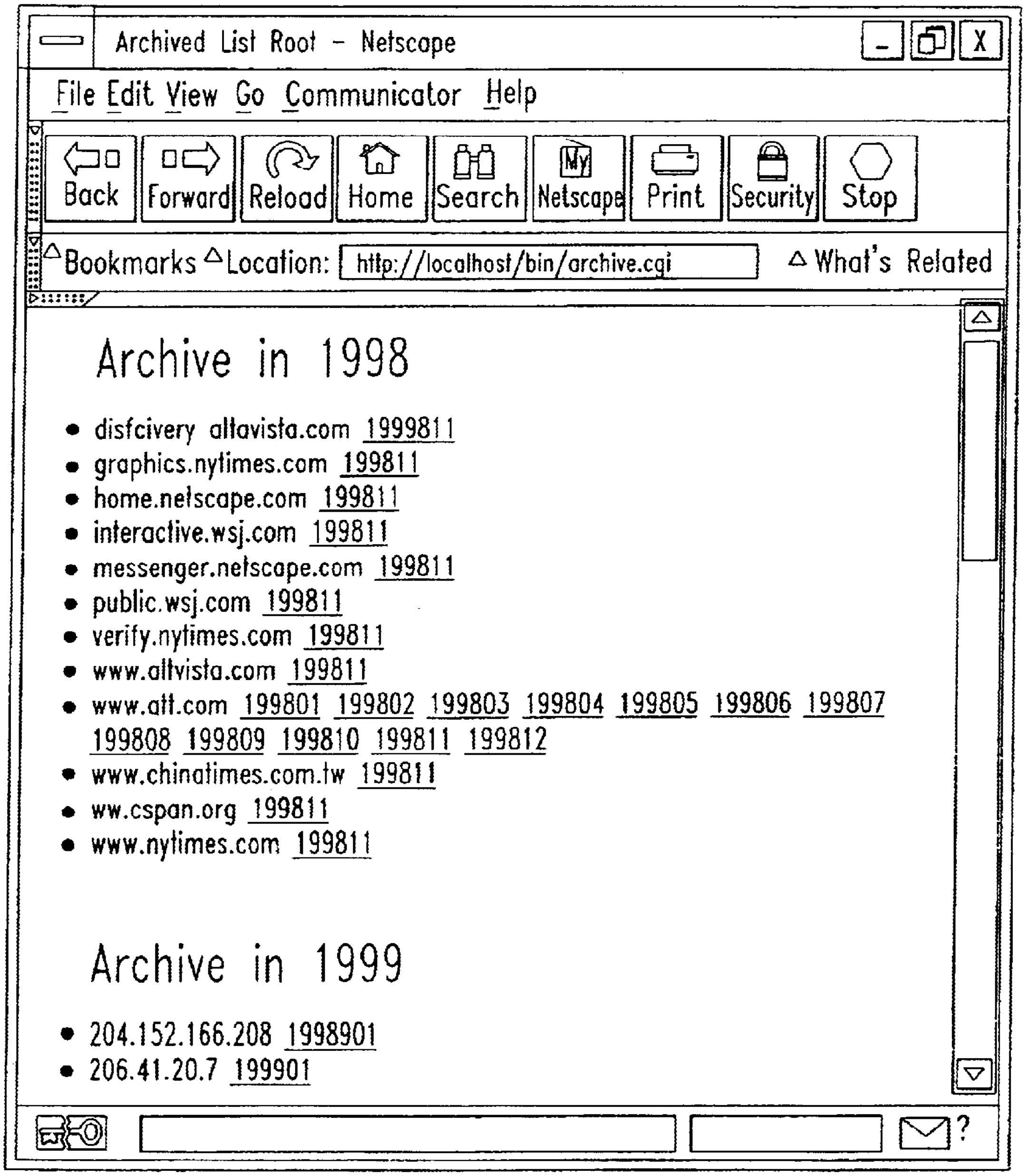
FIG. 13 sets forth a screenshot of an example archiving menu.

As for retrieving information from the repository, FIG. 13 shows how an example screenshot of an interface that can be used to browse the archived information. Each month's data of each website can be stored in a repository structure similar to a Unix-like pax archive. A cgi program creates a page on-the-fly based on the contents of the archive and creates hyperlinks for each website name. The hyperlinks are listed for each month when the certain pages of the website were archived. For example, the AT&T website has a cron job to archive the web pages on a daily basis, so the data in FIG. 13 has all twelve months in 1998 listed as hyperlinks.

Figures 14, 15:
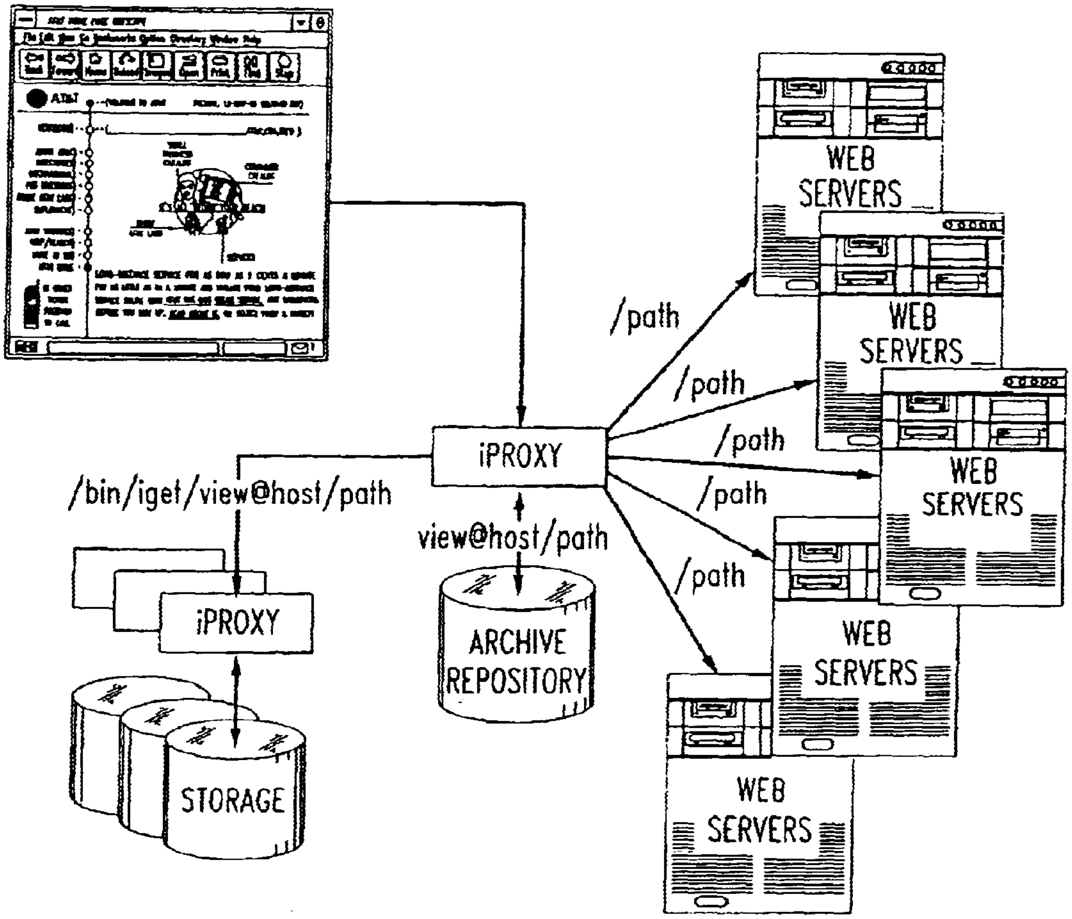
FIG. 14 sets forth a diagram illustrating the use of multiple archiving repositories.
FIG. 15 sets forth an example of scripting directives embedded in an HTML comment.

Multiple archive repositories can take advantage of the above-mentioned features for inter-proxy communication to share the burden of storing the information. For example, FIG. 14 shows how multiple archive repositories can collaborate in the archiving task. Proxy server in FIG. 14 queries another repository in order to answer a user request. As shown in FIG. 14, the following advantageous web interface can be used to search the repository or repositories:

http://proxyhost/bin/iget/view@host/path

A repository search path variable can be set using a command such as:

RepositoryPath=Host:Port[;Host:Port]*

Thus, multiple repositories may be easily addressed and accessed to quickly locate the desired information.

6. Packaging Service

A packaging service can be provided which would allow the browsing of document pages from portable packages. The package is portable in that it can be possible to attach one to an e-mail or to copy one from one machine to another. To create a package, the walking facility may be used to visit the sets of web pages that are designated to be packed. Thus, the system would accept (a) a root URL, (b) a parameter expressing the depth of the walking through the root URL's direct and indirect references, (c) an image option to decide whether or not to include the image files when walking through the web pages, (d) a reference filter option (for accessing all references or filtering out some of them), (e) mechanisms for storing cookies needed for accessing the root URL, and (f) a package name. The system then walks through the set of web pages rooted by the designated URL and packs them into a package using the designated name. The package can use any of the number of known conventional compression formats to package the data. The package is advantageously self-contained, including two physical files: one for contents and another for indexing. Each package can maintain its own index table.

In order to browse the package, the proxy system can support functions to access the web pages stored in the package as if they were from the original web sites. The packages are stored on a local disk, and browsing does not require a network connection. When browsing, the server uses the above-mentioned index table to locate corresponding content in the package. The server that generates the package may be different from the one that browses the package. The cookies used to traverse the web pages are automatically handled by the system.

New documents can easily be appended to an existing package. A single package may, in fact, contain more than one root URL. Each root URL in the package can be chosen as an entry point to browse the package.

7. Personalized Services

It is notable that the proxy system described above can have access to a user's private information such as the web access history and sensitive financial information. A user may not be comfortable with providing this information to a server across the communication network. The same information can be stored in a safe location locally, on the client machine where the proxy has been integrated on the client-side or on a local centralized proxy closer to the user. The present invention permits several new personalized services to be provided.

The proxy can be used to integrate in an automatic manner the information provided by a typical portal with sensitive personal information. For example, a user issues a request for the following URL:

http://www.att.net/?iproxy&action=portal

The portal command would cause the proxy server to retrieve the home page from www.att.net, which has been encoded with scripting directives that instruct the proxy server how to process the local data and merge it with the server contents. It then presents the personal portal page back to the user. In order to provide scripting that is non-intrusive to other users who are not using the present invention, the scripting directives can be embedded in HTML comments as shown in FIG. 15. The proxy server intercepts the directives in FIG. 15 and performs the necessary actions before returning the server portal page to the browser. All the directives, being embedded in an HTML comment, are ignored by browsers not using a proxy server configured in accordance with the present invention.

Figure 16:
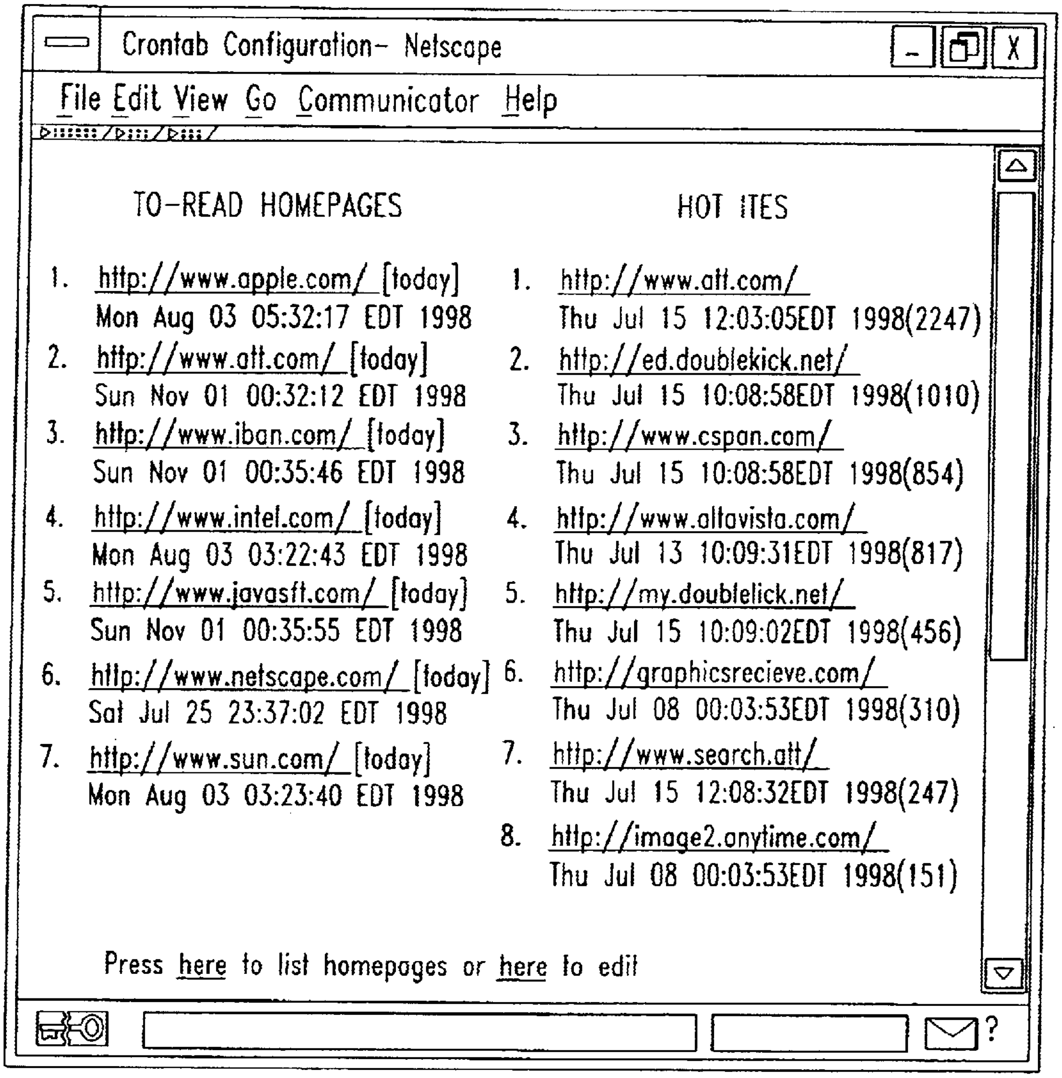
FIG. 16 sets forth a screenshot of an example personalized portal.

The following are some illustrative examples of how to use the capabilities of personalizing information retrieved from the public servers. They are merely examples and are not meant to limit the nature of the present invention:

Personal Web Page Reminders and Hot Sites. Since the proxy server can log a user's web accesses, it can analyze the log and use the data to provide new web services that can improve the user's browsing experience. FIG. 16 shows, for example, two possible services: (1) "TO-READ" homepages. A user can specify a list of websites and corresponding frequencies when certain websites should be visited. The proxy can check the last visiting dates and schedule a list of pages that the user should visit today. (2) "HOT Sites." The proxy server can compute the number of visits to each website and list the top ten websites with their last visiting dates accordingly as soon as the user accesses his/her personal portal. There are several advantages of having such a list. The user may want to know the last visiting time of a favorite site—the timestamp can be displayed along with the website link. The user may wish to access the latest version by clicking on the link. The user may wish to compare the new version with the old using some differencing tool, especially since the previous versions of the web page can be archived as described above. FIG. 15 shows the directives used to construct the page displayed in FIG. 16. The directive "to-read" constructs a list of web pages scheduled to be read; the directive "dolog" analyzes the current web access log to produce the statistics need for the next directive, "top10" which presents the results on the personal portal.

Figures 17, 18:
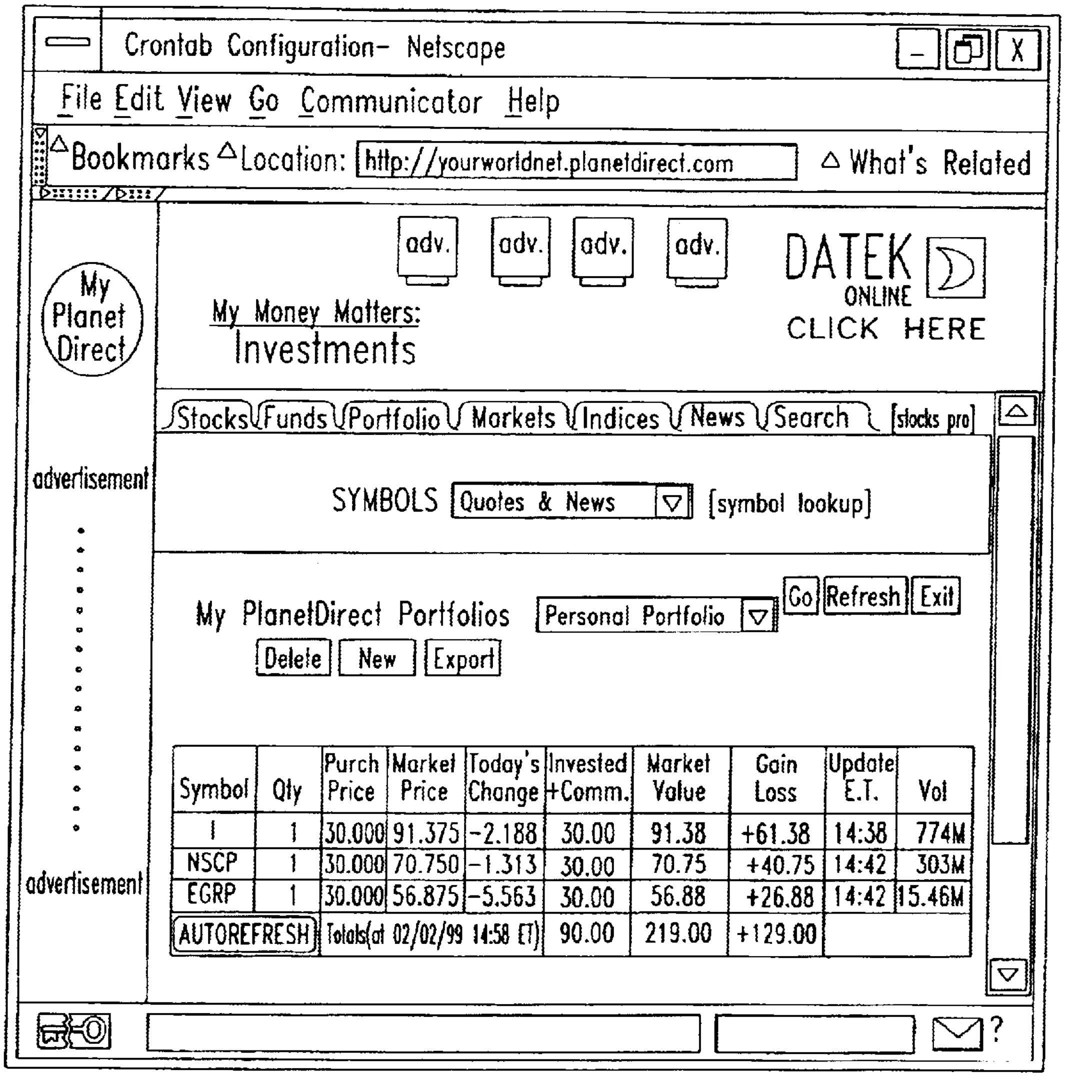
FIG. 17 sets forth a screenshot of an example prior art portal displaying financial information.
FIG. 18 sets forth a screenshot of an example personalized portal.

Personalized Financial Page. Most portals currently allow users to specify the stocks that they are interested in and display the latest stock price when a user accesses the personalized page. See FIG. 17 which shows a typical AT&T WorldNet portal showing various stock quotes. However, the portal cannot compute your current balance or net gain/loss unless you provide private and sensitive information like how many shares you own and when you purchased them. Most users would not like to provide such information to their portal page server. In accordance with an embodiment of the present invention, such personalized information such as real purchase price, commission fees, and the number of shares of each stock can be stored and accessed by the proxy server. By constructing an output filter for the stock page, the proxy server can retrieve the private information, combine it with stock quotes provided by the portal site to compute the balance, net gain/loss, and other interesting personalized information/statistics. FIG. 18 shows the same view as FIG. 17 personalized with the user's information. This can be accomplished by a specification like the following in the proxy configuration file:

OutputFilter/bin/portfolio.cgihttp://stocks.planetdirect.com/portfolio.asp

This instructs the system to apply the Java class "portfolio" as an output filter whenever the browser issues the corresponding http request. The numbers in FIG. 18 are visible only to the client and not the original portal server. The user is shown as having bought 267 AT&T shares, 50 Netscape shares, and 40 E*Trade shares at the respective prices of $36.50, $21.0, and $39.38, each. The commissions were 0, $19.95, and $19.95. The total gain was $17,799.02. The numbers replaced by the proxy server are shown in a different shade.

Personal Web Archive. While current search engines allow users to find pages of a certain topic easily, they do not offer much help in looking and viewing the pages a user has seen in the past, except for those that are still kept in the browser cache. Due to the sharp decrease in storage costs, a client-side proxy can afford to archive all the web pages a user has seen so that any of these pages can be retrieved easily later on—without even bookmarking them. Existing webpage search tools such as Alta Vista Discovery can be used to index the web archive and search the pages. A user can then quickly conduct a search of all pages he/she has seen in the last year, for example. As described in the archiving section above, the instant system can intercept http requests and effectively extend the URL name space to address pages stored in the archive by adding a timestamp in front of the regular http address. Even as the web pages go through major redesigns, the original pages can be accessed using the archive extensions to give the same content.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description has been described with particular emphasis on the Internet standards of HTFP, URL's, and HTML. However, the principles of the present invention could be extended to other protocols for serving information from a server to a client. Such an extension could be readily implemented by one of ordinary skill in the art given the above disclosure.

What is claimed is:

1. A proxy server interposed between at least one client browser and a server, the proxy server comprising:

a first interface for establishing a document serving protocol channel to the server;

a second interface for establishing a second document serving protocol channel to the client browser;

a storage device for archiving documents;

a processor adapted to (i) receive a first requests from the client browser for one or more documents on the server, (ii) retrieve the documents from the server, (iii) store the documents on the storage device, (iv) associate the stored documents with date information indicating when the documents were retrieved from the server, (v) sending the documents to the client browser, (vi) receive at a later time a second request from the client browser wherein the request contains an archive directive, (vii) parse the second requests for an archive directive, and, (viii) where the requests contain an archive directive requesting an archived copy of the one or more documents and specifying an archival date or a range of archival dates, (a) access the storage devices, (b) search for date information associated with documents stored on the storage device that match the archival date specified in the request, (c) if there is matching date information, retrieving the documents from the storage device associated with the date information and sending the retrieved documents to the client browser, and (d) if there is more than one matching date information, sending a list of archived documents with associated matching date information to the client browser.

2. The proxy server of claim 1 wherein the documents stored on the storage device are stored as a set in a portable package on the storage device and are sent to the client browser as a set in the portable package when requested by the client browser in the archive directive in the request.

3. The proxy server of claim 1 wherein the archive directive is expressed as a uniform resource locator with a format of date@host/path.

4. The proxy server of claim 1 wherein the document serving protocol is the hypertext transfer protocol.

5. The proxy server of claim 1 wherein the document is a web page.

6. A computer readable medium containing executable program instructions for performing a method on a proxy server interposed between at least one client browser and a server comprising the steps of:

receiving a first requests from the client browser for one or more documents on the server, retrieve the documents from the server, store the documents on a storage device, associate the stored documents with date information indicating when the documents were retrieved from the server, sending the documents to the client browser, receive at a later time a second request from the client browser wherein the request contains an archive directive, parsing the second requests for an archive directive, and, where the requests contain an archive directive requesting an archived copy of the one or more documents and specifying an archival date or a range of archival dates, accessing the storage device, search for date information associated with documents stored on the storage device that match the archival date specified in the request, if there is matching date information, retrieving the documents from the storage device associated with the date information and sending the retrieved documents to the client browser, and if there is more than one matching date information, sending a list of archived documents with associated matching date information to the client browser.

7. The computer readable medium of claim 6 wherein the documents stored on the storage device are stored as a set in a portable package on the storage device and are sent to the client browser as a set in the portable package when requested by the client browser in the archive directive in the request.

8. The computer readable medium of claim 6 wherein the archive directive is expressed as a uniform resource locator with a format of date@host/path.

9. The computer readable medium of claim 6 wherein the document serving protocol is the hypertext transfer protocol.

10. The computer readable medium of claim 6 wherein the document is a web page.

* * * * *